(12) United States Patent
Moon et al.

(10) Patent No.: US 6,936,795 B1
(45) Date of Patent: Aug. 30, 2005

(54) METHOD AND APPARATUS FOR SECURING A POWER HEAD ON AN ELECTRIC COOKER

(75) Inventors: Jung S. Moon, Buffalo Grove, IL (US); Rong Liu, Gurnee, IL (US); Kitak Chae, Seoul (KR); Jongrok Kim, Seoul (KR)

(73) Assignee: Hearthware Home Products, Inc., Gurnee, IL (US)

( * ) Notice: Subject to any disclaimer, the term of this patent is extended or adjusted under 35 U.S.C. 154(b) by 0 days.

(21) Appl. No.: 10/824,294

(22) Filed: Apr. 14, 2004

(51) Int. Cl.[7] .............................................. A21B 1/00
(52) U.S. Cl. ....................... 219/400; 126/21 A; 99/476
(58) Field of Search ...................... 219/400; 126/21 A; 99/446, 476

(56) References Cited

U.S. PATENT DOCUMENTS

| | | | | |
|---|---|---|---|---|
| 5,165,328 A | * | 11/1992 | Erickson et al. .......... | 126/21 A |
| 5,329,919 A | * | 7/1994 | Chang ........................ | 219/400 |
| 5,466,912 A | * | 11/1995 | Dornbush et al. .......... | 219/400 |
| 6,201,217 B1 | * | 3/2001 | Moon et al. ................ | 219/400 |
| 6,747,250 B1 | * | 6/2004 | Cha ........................... | 219/400 |

* cited by examiner

Primary Examiner—Joseph Pelham
(74) Attorney, Agent, or Firm—Greer, Burns & Crain, Ltd.

(57) ABSTRACT

An electric cooker includes a base, a housing supported on the base and having an opening, and a power head configured to be removably attached to the housing at the opening. The power head includes a heating unit for generating and directing heat into the housing. At least one land piece is provided on the power head for securing the power head onto the housing, and at least one corresponding tab piece is provided on the housing and is configured to matingly engage the land piece for removably attaching the power head onto the housing. A locking device provided on the power head proximate the land piece prevents the land piece and the tab piece from disengaging from a temperature increase inside the housing.

24 Claims, 9 Drawing Sheets

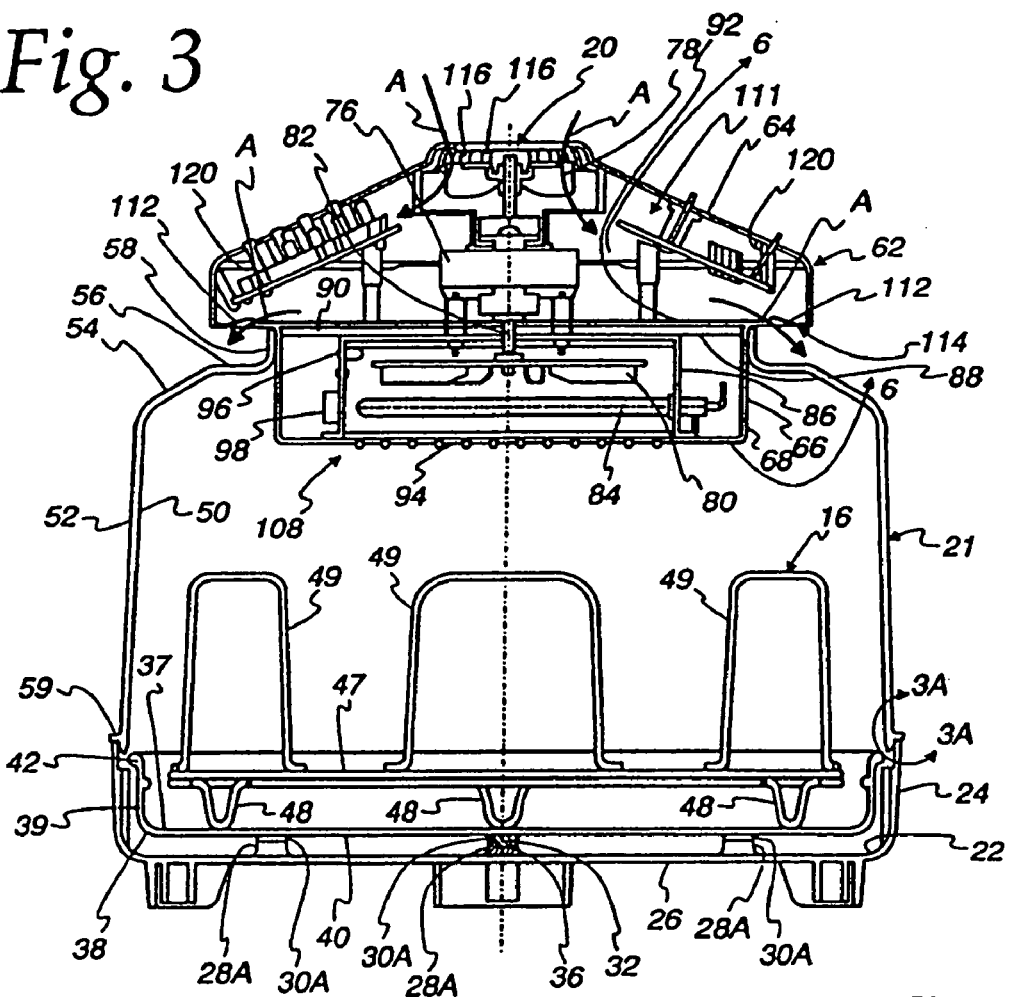
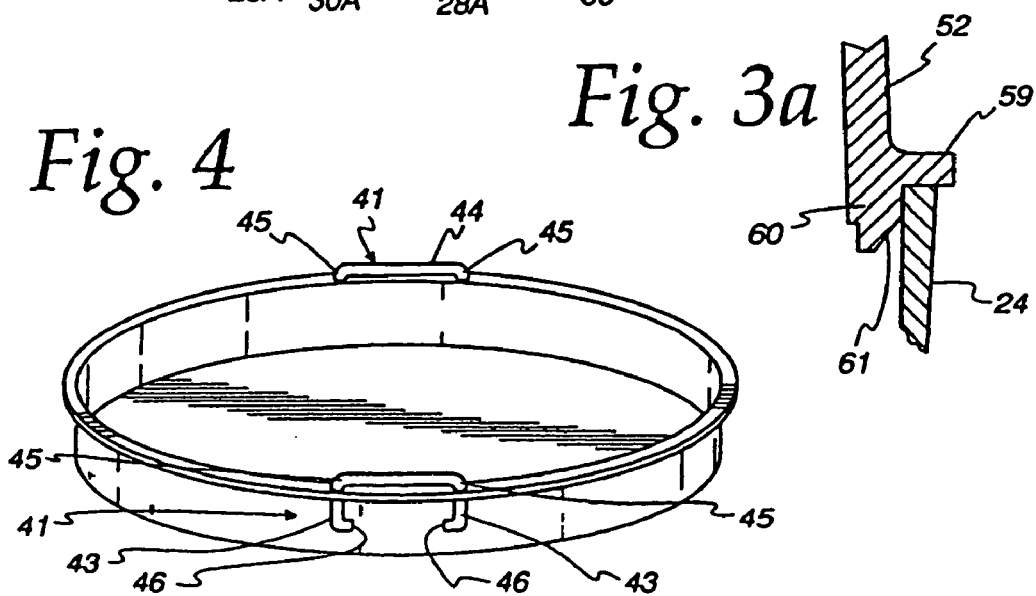

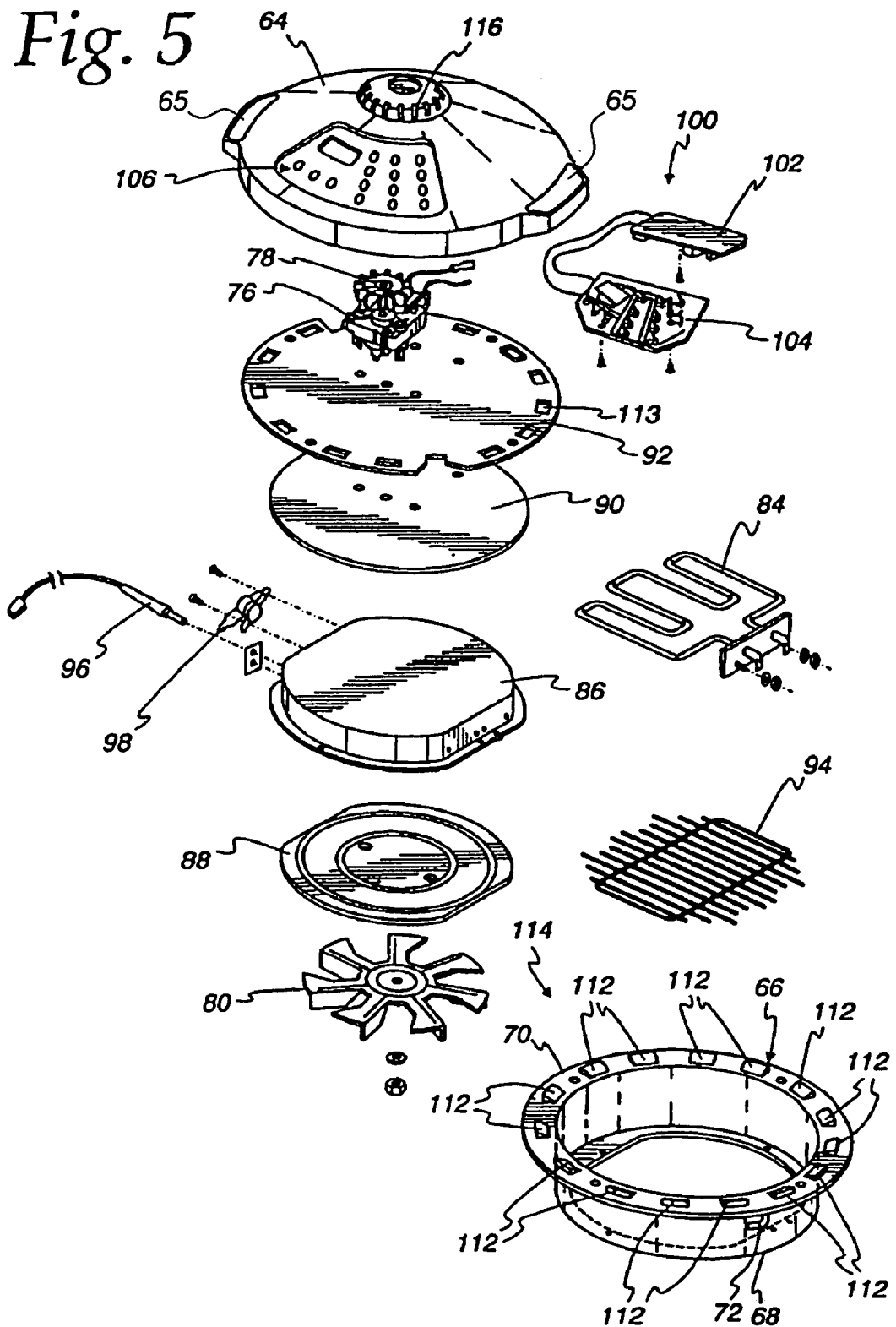

METHOD AND APPARATUS FOR SECURING A POWER HEAD ON AN ELECTRIC COOKER

FIELD OF THE INVENTION

This invention relates to electric cookers, and in particular to an electric cooker having a removable power head.

BACKGROUND OF THE INVENTION

In comparison to conventional ovens, counter-top electric ovens or cookers typically offer the advantage of being less bulky and having quicker cooking times. These counter-top cookers or ovens include a power head having a heating unit that is used to heat the cooking enclosure. To reduce the cooking time, counter-top electric ovens typically will rely on a hot air stream that is cycloned around the food by a high speed fan associated with the electric heating element, or by utilizing an infrared heating element in combination with a relatively low speed fan that generates sufficient air circulation in the oven to ensure a relatively uniform temperature distribution in the oven.

Typically, the power head is configured to be seated in the top opening of an oven housing and locked into place by engaging projections or tabs on the rim of the oven housing with corresponding grooves or slots on the power head. In this manner, the power head and the oven housing can be lifted off the base of the oven together as a unit for access to the inside of the cooking enclosure. Locking the power head and the oven housing together also prevents the power head from being lifted off the oven housing during cooking by the pressure built-up inside the cooking enclosure.

Very often the oven housing is made of heat resistant, transparent plastic or glass to enable the user to maintain visual progress of food item being cooked. As a result, known oven housings tend to expand with the temperature increase in the cooking enclosure, causing the locking mechanisms to disengage. Consequently, there is a risk that the power head will become detached from the oven housing during the cooking operation from the pressure inside the cooking enclosure. The oven housing could also slip off the power head as the user lifts the power head to gain access to the inside of the cooking enclosure.

SUMMARY OF THE INVENTION

An electric cooker includes a base, a housing supported on the base and having an opening, and a power head configured to be removably attached to the housing at the opening. The power head includes a heating unit for generating and directing heat into the housing. At least one land piece is provided on the power head for securing the power head onto the housing, and at least one corresponding tab piece is provided on the housing and is configured to matingly engage the land piece for removably attaching the power head onto the housing. A locking device provided on the power head proximate the land piece prevents the land piece and the tab piece from disengaging from a temperature increase inside the housing.

BRIEF DESCRIPTION OF THE DRAWINGS

FIG. 3 is a diagrammatic section view of the oven shown in FIG. 1;

FIG. 3A is an enlarged view of the area indicated by lines 3A—3A in FIG. 3;

FIG. 4 is a perspective view of an oven pan of the oven shown in FIG. 1;

FIG. 5 is an exploded view of a power head of the oven shown in FIG. 1;

DETAILED DESCRIPTION OF THE INVENTION

Figure 1:
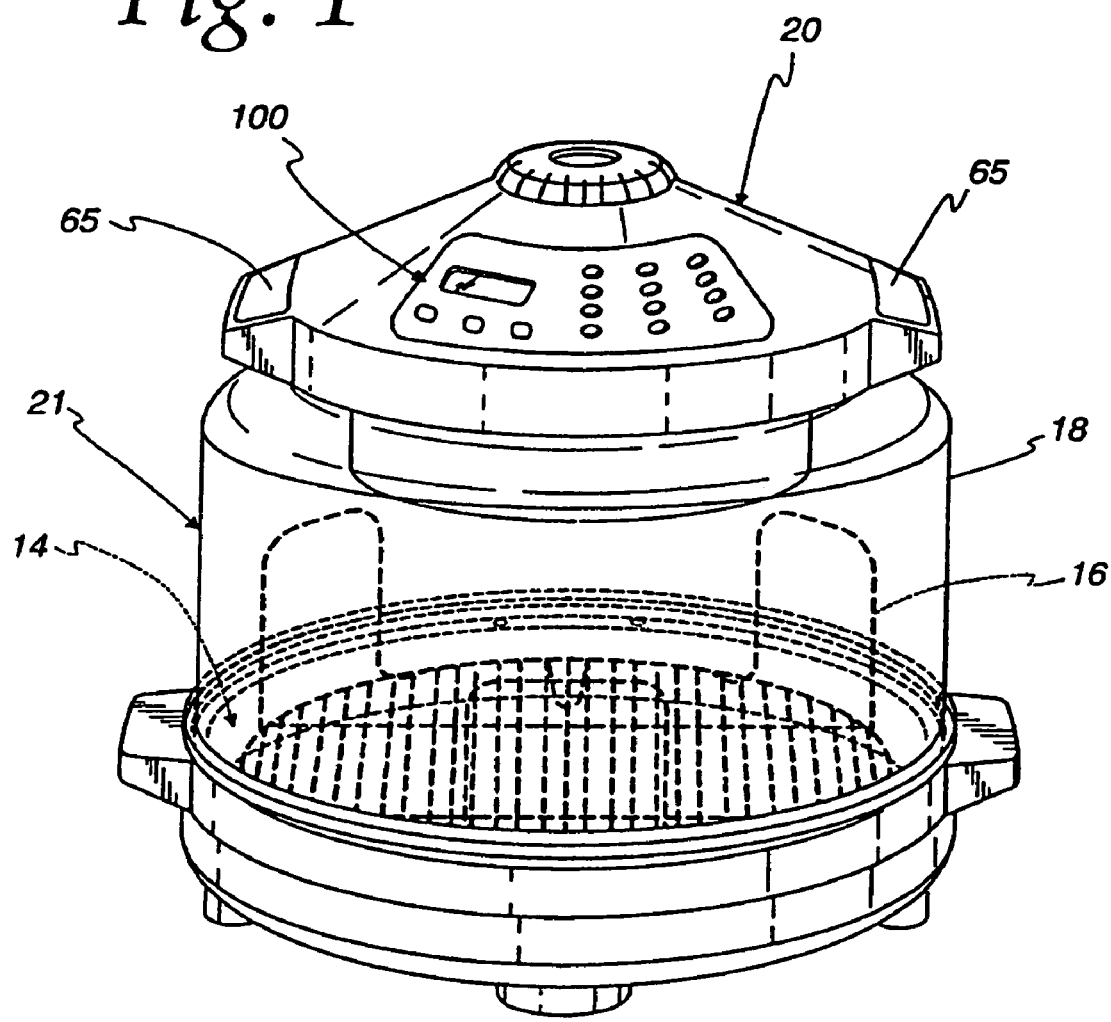
FIG. 1 is a perspective view of a counter-top electric oven or cooker in accordance with an embodiment of the invention.

Broadly stated, an embodiment of the present invention is directed to a counter-top electric oven or cooker including a base, an oven housing supported on the base, and a power head for generating and directing heat into the oven housing. The power head also includes several brackets fixed along the bottom surface for preventing the power head from unexpectedly becoming detached from the oven housing.

An embodiment of a counter-top electric oven made according to one embodiment of the invention is described herein and is illustrated in the drawings in connection with an infrared counter-top oven. However, it should be understood that many features of the invention may find utility in other types of counter-top electric cooking ovens, including those using cyclonic air flow in combination with simple resistance electric heating elements. Accordingly, no limitation is intended to use in connection with an infrared heating element except insofar as expressly stated in the appended claims.

Figure 2:
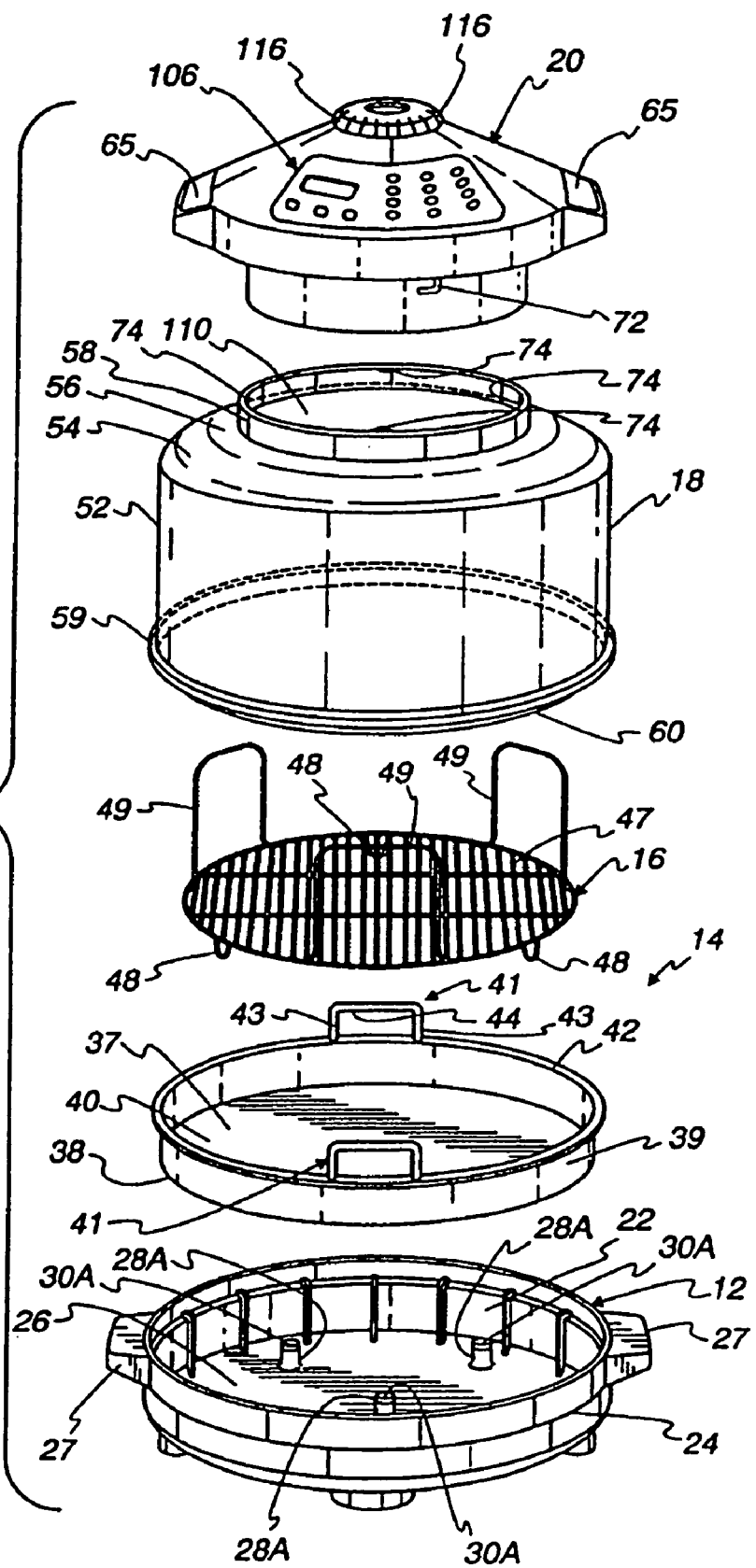
FIG. 2 is an exploded view of the oven shown in FIG. 1.

With reference to FIGS. 1 and 2, a counter-top electric oven 10 includes a base 12, an oven pan 14 supported by the base 12, a cooking rack 16 supported by the oven pan 14, a generally cylindrical, a transparent oven housing 18 supported by the base 12, and a power head 20 supported on the oven housing 18 and detachably connected to the oven housing 18. Together, the oven pan and the oven housing 18 define a cooking enclosure 21 with the oven 10 in the assembled state shown in FIG. 1.

As best seen in FIGS. 2 and 3, the base 12 has an interior surface 22 defined by a generally cylindrical side wall 24 and a planar bottom 26. A pair of handles 27 extend from the cylindrical side wall 24 to allow a user to move the oven 10 from one location to another. The interior surface 22 surrounds the oven pan 14 and is spaced from the oven pan 14 by an air gap. The base 12 further includes one or more supports 28 for the oven pan 14 and one or more thermal insulators 30 between the one or more supports 28 and the oven pan 14 to prevent overheating of the base 12 by the heat from the oven pan 14. In the embodiment shown in FIGS. 2 and 3, the one or more supports 28 are provided in the form of three cylindrical pillars 28A, and the one or more thermal insulating spacers 30 are provided in the form of three cylindrical spacers 30A, each supported by one of the pillars 28A. As seen in the section view of the spacer 30A and pillar 28A in FIG. 3, each of the spacers 30A includes a cylindrical stub 32 that is engaged in a mating hole 36 in each pillar 28A to retain each of the spacers 30A to the respective pillar 28A. While it is preferred that the cross-sections of the spacers 30A and the pillars 28A be generally circular, it should be understood that the invention contemplates non-circular cross-sections, such as, for example, triangular, oval, square, rectangular, trapezoidal, hexagonal, etc. The oven pan 14 is supported on the insulators 30 to maintain the air gap between the interior surface 22 and the cooking pan 14 and to prevent overheating of the base 12, including the handles 27. In one embodiment, the plastic base 12 is made from a suitable polycarbonate material and the thermal insulators 30 are made from a suitable silicone rubber insulating material.

The metallic oven pan 14 includes an interior surface and an exterior surface 38 defined by a cylindrical side wall 39 and a planar bottom 40. The oven pan 14 is a one piece construction made of aluminum plate with a suitable non-stick PTFE coating on the interior surface 37. A pair of retractable handles 41 are mounted to a lip 42 that defines an outer periphery of the oven pan 14. The handles 41 are mounted to the lip 42 for movement between a first position, shown in FIG. 2, where the handles 41 are extended from the lip 42 so that a user may grasp the handles 41 to remove the pan 14 from the base 12, and a second position, shown in FIG. 4, where the handles 41 are retracted toward lip 42 to allow the oven housing 18 to be positioned above the oven pan 14, as shown in FIG. 3, without interfering with the handles 41. As best seen in FIG. 4, each of the handles 41 has a pair of legs 43 extending from a grasping member 44. Each of the legs 43 are received in a vertical guide hole 45 formed in the lip 42 to guide the handles 41 between the first and second positions. Each of the legs terminate in a tab 46 that engages the lip 42 with the handle 41 in the first position. The handles are made from a unitary piece of metallic wire that is bent to form the grasping member, the legs 43, and the tabs 46.

The cooking rack 16 includes a planar grid 47 for supporting food items that are being cooked, a first set of loop projections 48 extending in one direction from the plane of the 47 and a second set of loop projections 49 extending in the opposite direction from the plane of the grid 47. The projections 48 can be used to support the grid to provide a first cooking height for food items supported by the grid 47, while the projections 49 can be used to support the grid 47 to provide a second cooking height for the grid 47. The cooking rack 16 is made from 304 stainless steel with a suitable non-stick PTFE coating in one embodiment.

As best seen in FIG. 3, the oven housing 18 includes an interior surface 50 defined by a generally cylindrical side wall 52 that blends into a generally conical shaped side wall 54 which in turn blends into a planar upper wall 56 which finally blends into a generally cylindrical ring portion 58. An annular lip 59 is formed on the outer surface of the wall 52 and serves to support the oven housing 18 on the side wall 24 of the base 12. A portion 60 of the wall 52 that extends below the lip 59 cooperates with the side wall 24 of the base 12 to restrict the leakage of hot gases, such as steam, from the cooking enclosure 21. As best seen in FIG. 3A, the portion 60 includes an annular lead-in chamfer or relief 61 that serves to guide the portion 60 into the base 12, thereby easing the engagement of the oven housing 18 to the base 12 and preventing the mislocation of housing 18 relative to the base 12, i.e., the housing 18 can be inserted into the base 12 while being tilted somewhat relative to vertical. In one embodiment, the oven housing 18 is formed from a suitable transparent polycarbonate material. However, other material such as glass, or even metal may be used.

Figure 9:
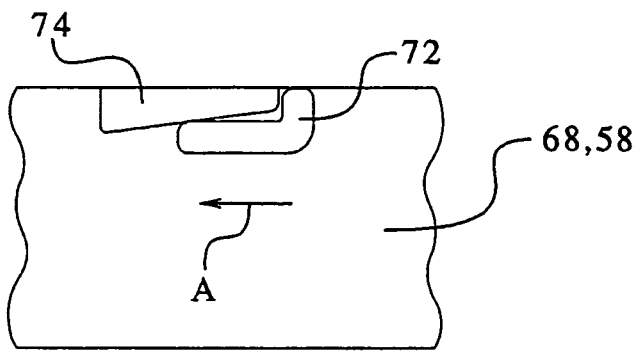
FIG. 9 is a diagram illustrating a land and a tab for attaching the power head to the oven housing.

As best seen in FIGS. 3 and 5, the power head 20 includes an exterior housing assembly 62. The assembly 62 includes a domed shape upper housing 64 having a pair of handles 65 (best shown in FIG. 5), and a lower housing 66 including a generally cylindrical wall portion 68 and an annular flange 70. As seen in FIG. 2, four substantially equally spaced lands 72 (only one shown) are raised from the wall portion 68 to engage a plurality of corresponding ramped tabs 74 formed on the ring portion 58 of the housing 18 to detachably connect the power head 20 to the housing 18. A illustration of the manner in which the tabs 74 engage the lands 72 are shown in FIG. 9. The land 72 engages the tab 74 when the power head 20 is rotated in the clockwise direction, thereby moving the land on the wall portion 68 in the direction indicated by arrow "A" towards the stationary tab projecting from the ring portion 58 of the housing 18.

The power head 20 further includes a motor 76 for driving a cooling fan 78 and an oven fan 80 via a common shaft 82, an infrared electric heating element 84, a heater/fan housing 86, a radiation plate 88 mounted to an interior surface of the heater housing 86, a glass fiber thermal insulator 90 mounted between the heater housing 86 and the motor 76, a mica sheet 92 mounted between the upper housing 64 and the lower housing 66, a protective grid 94, a thermistor 96, a thermostat 98, and a controller 100 including a pair of control boards 102 and 164 for controlling the heating element 84 and the motor 76 in response to signals from the thermistor 96 and command signals input into a control panel 106 by a user.

In one embodiment, the fan 78 is made of a suitable plastic material, while the fan 80 and the radiation plate 88 are made of aluminum plate in order to reflect the infrared energy from the heater 84 down toward the interior of the cooking enclosure 19. The motor 76 drives the fans 78 and 80 at a speed in the range of about 2500 rpm, which should provide an adequate air flow from the fan 80 to create a relatively even temperature throughout the cooking enclosure 21 and to speed the cooking of food by convection to supplement the infrared cooking, without generating the high speed air motion associated with some cyclonic electric counter-top ovens. Another benefit of the relatively low speed air flow created by the fan 80 is that it helps to maintain the hot surfaces of the oven 10 in a temperature range that will tend to emit infrared radiation and limits the decrease in emissivity of the non-metal materials of the oven 10.

Together, the cylindrical wall 68 of the lower housing 66, the heater housing 86, the radiation plate 88, the fan 80, and the heating element 84 define a heating unit 108 that extends into the cooking enclosure 21 through an opening 110 defined by the ring portion 58 of the housing 18. Together, the upper housing 64 and the mica sheet 92 define a fan chamber 111 that is thermally insulated from the interior of the cooking enclosure 21 by the mica sheet 92, the glass fiber insulator 90, the heater housing 86, the radiation plate 88, and the lower housing 66. As best seen in FIGS. 3 and 5, a plurality of cooling air outlets 112 are formed in the annular flange 70 of the lower housing 66. Cut-outs 113 are provided in the mica sheet 92 to prevent interference between the outlets 112 and the mica sheet 92 and to allow a cooling air flow to pass through the mica sheet 92 to the outlets 112. The outlets 112 are generally equally circumferentially spaced around the flange 70.

Figure 6:
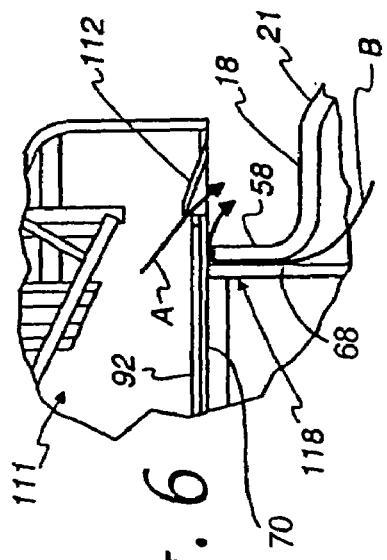
FIG. 6 is an enlarged view of the area indicated by lines 6—6 in FIG. 3.

Together the flange 70 and the outlets 112 define a cooling manifold 114 that surrounds the opening 110 of the housing 18 and faces the surface 56 outside of the cooking enclosure 21. The cooling fan 78 actively cools the fan chamber 111 and the walls 52, 54, 56 and 58 of the housing 18 by drawing a cooling air flow through a plurality of inlet openings formed in the upper housing 64 and forcing the cooling air to exit through the outlets 112, which direct the cooling air flow toward the surface 56 of the housing 18 to cool the housing 18, as indicated by arrows A;

As best seen in FIG. 6, the wall 68 and the flange 70 are spaced from the ring portion 58 of the housing 18 by the tabs 74 to define a hot gas vent 118 that surrounds the heating unit 108 between the heating unit and the outlets 112 to vent hot gas, such as steam, from the inside of the cooking enclosure 21 for mixture with the cooling air flow from the air outlets 112, as shown by the arrow "B".

The control boards 102 and 104 are spaced from the interior surface of the upper housing 64 by a plurality of mount supports 120 to allow the cooling air flow to pass over both sides of the control boards 102 and 104 as it circulates around the fan chamber 111 before exiting through the outlets 112, thereby enhancing the cooling of the electronics on the control boards 102 and 104.

Figure 7:
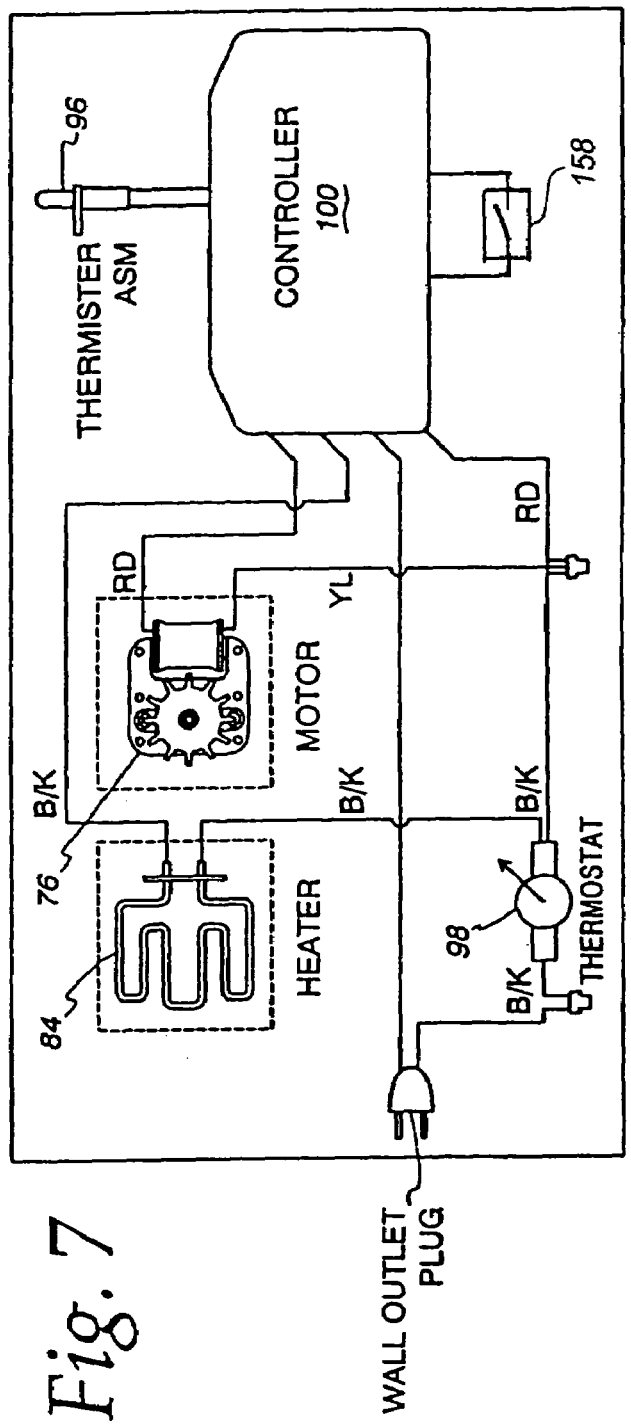
FIG. 7 is a diagrammatic representation of the operating components of the oven shown in FIG. 1.

As best seen in FIG. 7, the controller 100 is connected to the motor 76 and the heating element 84 to control the flow of electric power to the motor 76 and the heating element 84 in response to signals from the thermistor 96 and command signals input by the control panel 106 by a user. The controller 100 is configured to selectively power the heating element 84 at a number of power levels P from a minimum power to a maximum power. At each power increment P, the controller 100 powers the heating element 84 when the thermistor 96 indicates that the temperature in the cooking enclosure 21 has fallen below a low temperature set point associated with the particular power level P. The controller 100 then terminates power to the heating element 84 when the temperature indicated by the thermistor 96 exceeds a high temperature set point associated with the particular power level P. The controller 100 provides power continuously to the motor 76 during the heating operations regardless of the power level selected.

Figure 8:
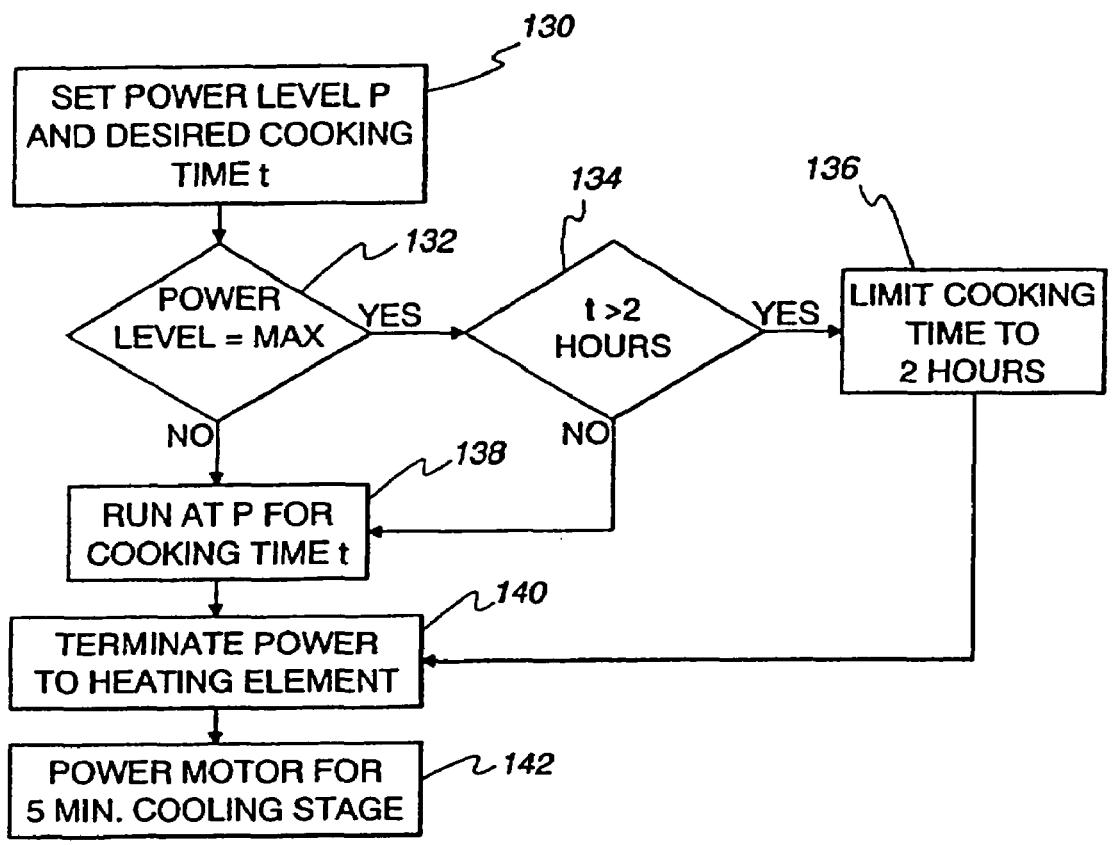
FIG. 8 is a flow chart illustrating selected operational features of the oven shown in FIG. 1.

As best seen in FIG. 8, the controller is configured to limit the cooking time at the maximum power setting to two hours to prevent overheating of the oven 100. More specifically, after a user sets the power level P and enters the desired cook time t at block 130, it is determined at 132 whether the power has been set to the maximum power level. If the power is set to maximum, it is determined at 134 whether the desired cooking time exceeds two hours. If the desired cooking time exceeds two hours, the cooking time is automatically limited to two hours by the controller 100 at 136. If the desired cooking time is less than two hours, or if the power level P is not set to maximum, the controller is configured to run the heating element 84 and the motor 76 at the power level P and for the desired cooking time t, as shown at block 138.

After the cooking time has expired, the controller 100 is configured to terminate power to the heating element 84 and to the motor 76. However, as an optional feature, after the cooking time has expired, the controller 100 can be configured to terminate power to the heating element 84 while providing power to the motor 76 for a five minute cooling stage, for example, as shown at 140 and 142. This may allow time for the hot gases in the cooking enclosure 21 to vent and to be cooled by the cooling air flow from the outlets 112, thereby preventing hot gases, such as steam from accumulating in the cooking enclosure 21 and/or the fan chamber 111 and also preventing the handles 65 from overheating.

Figure 10:
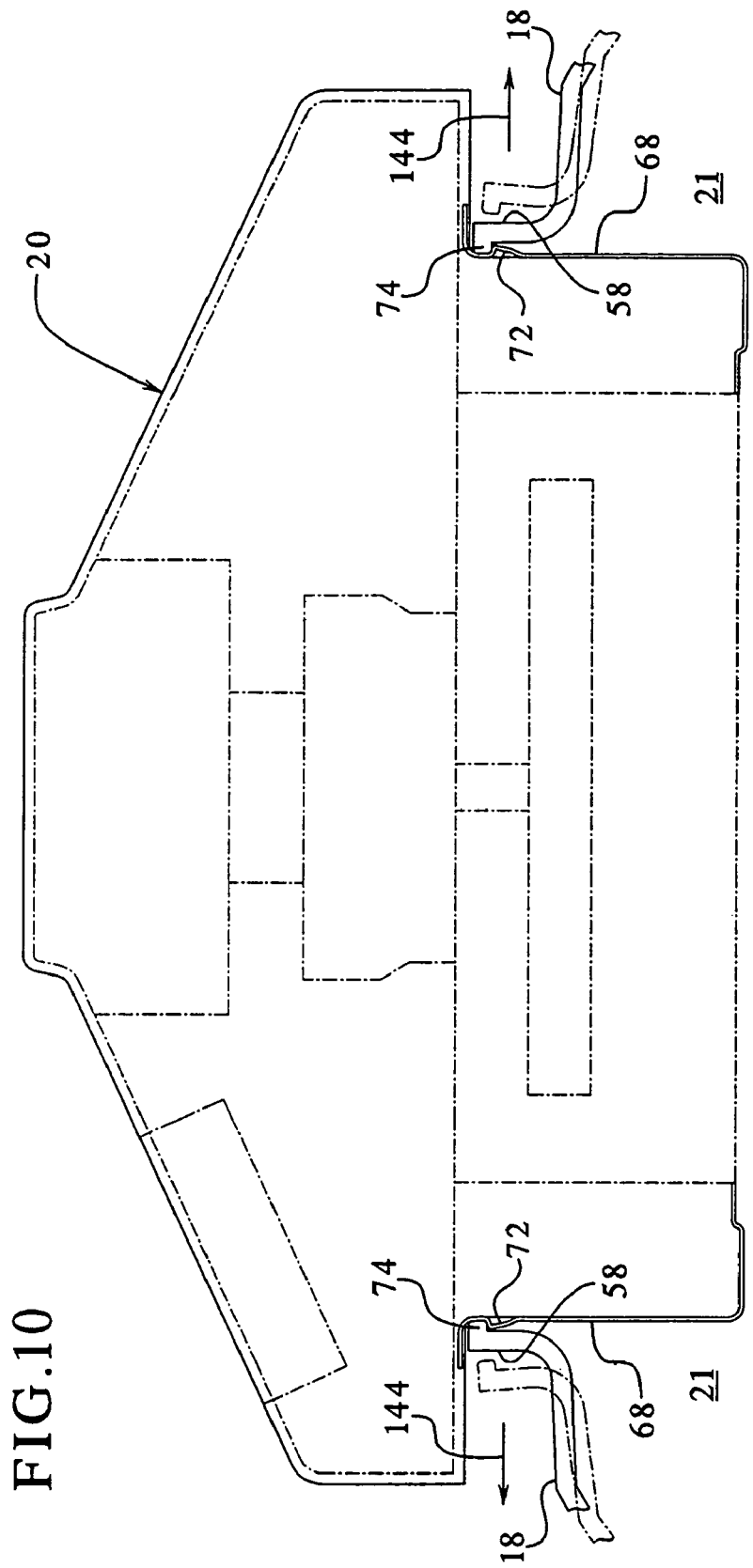
FIG. 10 is diagram illustrating the expansion of the oven housing during a cooking operation.

Turning now to FIG. 10, the power head 20 is shown attached to the oven housing 18 (partially shown), and locked together by the lands 72 (two shown) protruding from the wall portion 68 of the power head 20 to the corresponding tabs 74 projecting from the ring portion 58 of the oven housing. When the temperature inside the cooking enclosure 21 is relatively cool, the lands 72 and the tabs 74 remain locked to the housing 18, as shown in solid lines. However, as the temperature rises in the cooking enclosure 21, at least the ring portion 58 (shown in phantom) of the housing 18 may expand outwardly in the direction away from the wall portion 68 of the power head 20 (illustrated by arrows 144), causing the tabs 74 to be disengaged from the lands 72. Consequently, the pressure inside the cooking enclosure 21 may force the power head 20 to be unseated from the housing 18. Even if the power head 20 does not come off on its own, it likely will come off unexpectedly when an unsuspecting user lifts the power head 20, thinking he/she is lifting the housing 18 along with the power head 20.

Figure 12:
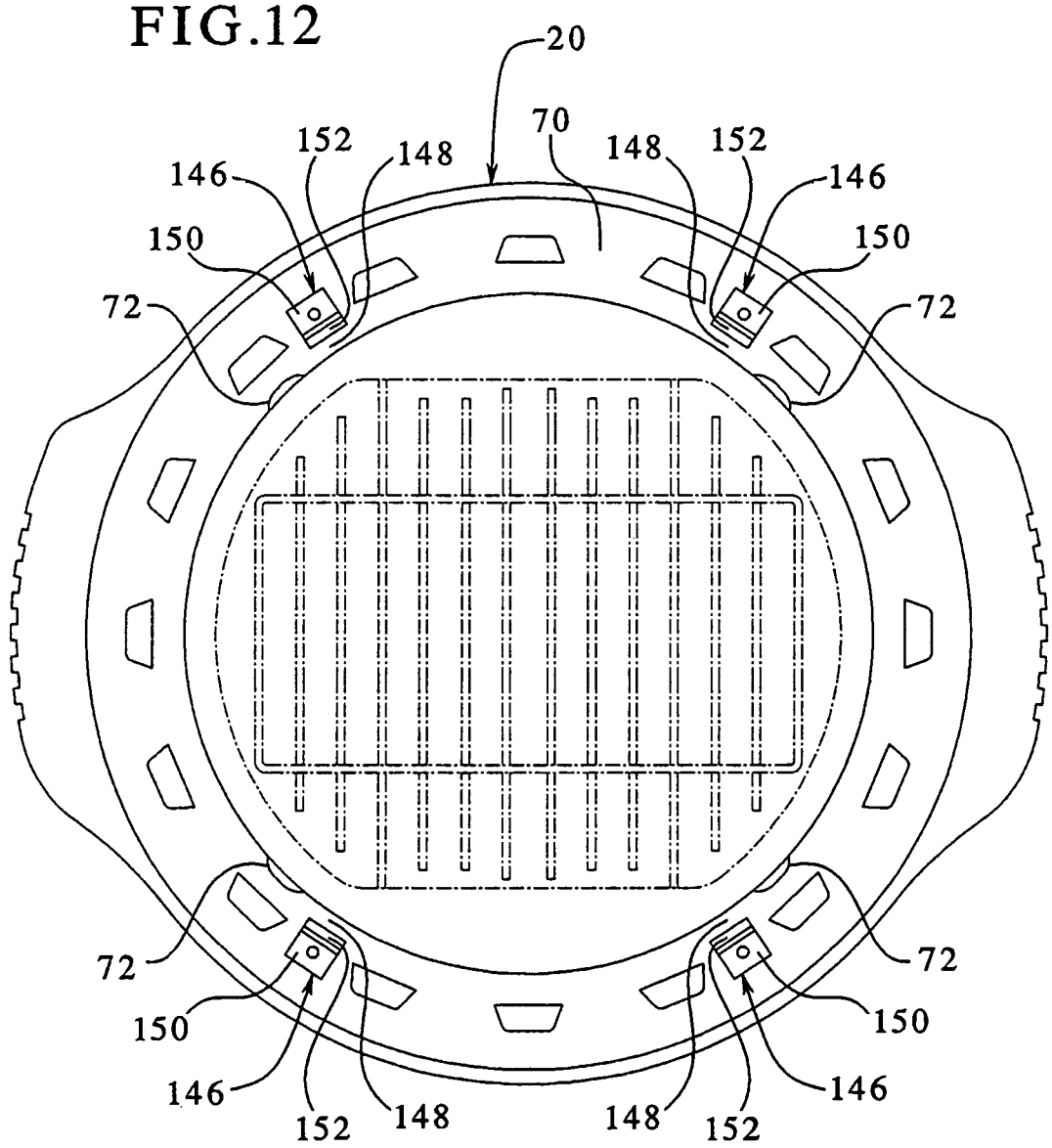
FIG. 12 is a bottom view of the power head of FIG. 11 including the locking brackets.
Figure 11:
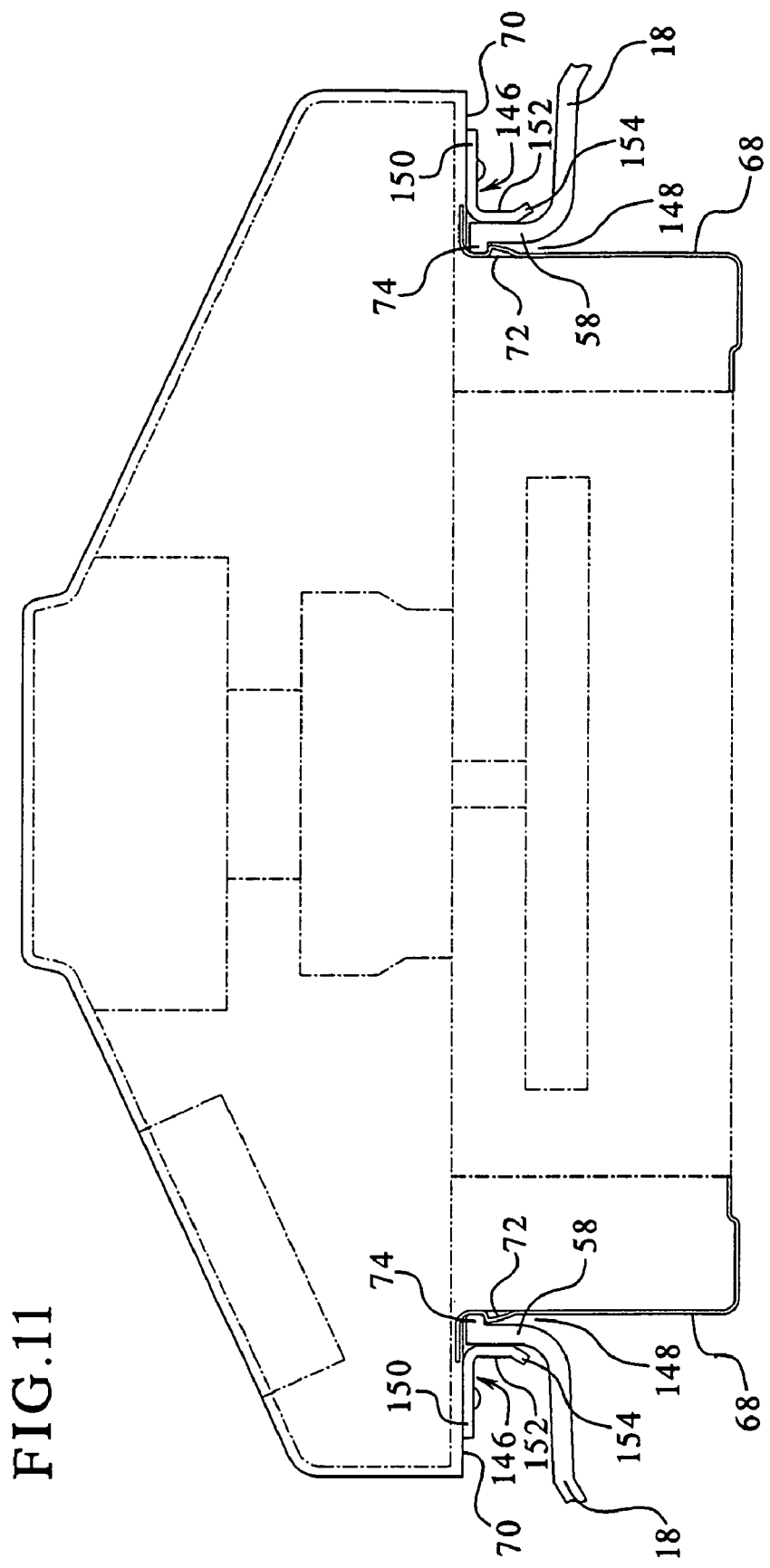
FIG. 11 is a diagrammatic partial sectional view of the power head including locking brackets in accordance with an embodiment of the invention.

Referring to FIGS. 11 and 12, and in accordance with an embodiment of the invention, several locking brackets 146 (two shown in FIG. 10) are attached proximate the protruding lands 72 along the annular flange 70 (best shown in FIG. 12). The locking brackets 146 are spaced from the wall portion 68 of the power head 20, from which the lands 72 protrude. Gaps 148 between the locking brackets 146 and the wall portion 68 are substantially the thickness of the ring portion 58 of the housing 18, so as to receive the ring portion substantially securely in the gap.

In one embodiment of the invention, the locking brackets 146 are formed from a substantially rigid, generally "L" shaped strip of material having a substantially straight horizontal portion 150 which is affixed to the annular flange 70, and a substantially straight, vertical portion 152 which is generally parallel to the wall portion 68 of the power head 20. In one embodiment of the invention, an end portion 154 extends from the vertical portion 152 at an angle (greater than zero to approximately 90 degrees) away from the wall portion 68 (best shown in FIG. 11). The end portion 154 assist in guiding the ring portion 58 into the gap 148 between the locking brackets 146 and the wall portion 68 of the power head 20.

It should be understood that the term "strip" as used in this application is not limited to a flat strip, but includes other cross-sectional shapes. The strip, for example, may be flat on the side facing the annular flange 70 but rounded on the opposite side, or a piece of wire with a diameter being sufficient to maintain a substantially rigid form, etc. The locking brackets 146 in one embodiment is metal, but other materials that remain substantially rigid after being formed into its generally "L" shape are also contemplated.

The horizontal portion 150 is affixed to the annular flange 70 by any known means such as welding, riveting, soldering, tightening by screws, etc., which may accommodate the cross-sectional shape of the horizontal portion. For example, screws or rivets might be more appropriate if the horizontal portion 150 is flat, but not, if a rigid piece of wire with a circular cross-section is used for the bracket 146.

In operation, the locking brackets 146 are positioned along the annular flange 70 proximate the protruding lands 72 (best shown in FIG. 12). When the power head 20 is inserted into the opening 110 of the oven housing 18 (best shown in FIGS. 2 and 3), the ring portion 58 of the housing is guided between the locking brackets 146 and the wall portion 68 of the power head. In the locked position in which the tabs 74 and the lands 72 are engaged (best shown in FIG. 9) to secure the power head 20 to the oven housing 18, the locking brackets 146 abut, or are in very close proximity to the ring portion 58 of the housing 18 (best shown in FIG. 11). Having this arrangement, the locking brackets 146 prevent the oven housing 18 from expanding in the direction away from the wall portion 68 of the power head 20 (as illustrated in FIG. 10), at least in the area where the tabs 74 and the lands 72 are located. In this manner, the locking brackets 146 keep the tabs 74 and the lands 72 engaged or locked together, thereby securing the power head 20 to the oven housing 18 even when the temperature inside the cooking enclosure is high enough to cause the oven housing to expand.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. An electric cooker, comprising:
   a base;
   a housing supported on said base and having an opening;
   a power head configured to be removably attached to said housing at said opening and including a heating unit for generating and directing heat into said housing;
   at least one first piece provided on said power head for securing said power head onto said housing;
   at least one second piece provided on said housing and configured to matingly engage said first piece for removably attaching said power head onto said housing; and
   locking means provided on said power head proximate said first piece for preventing said first and second pieces from disengaging from a temperature increase inside said housing.

2. The cooker as defined in claim 1, wherein said power head includes a manifold which rests on said opening of said housing and a wall portion extending from said manifold into said opening of said housing, and
   wherein said at least one first piece is provided on said wall portion and said at least one second piece is provided on said housing proximate said opening.

3. The cooker as defined in claim 2, wherein said at least one first piece is a plurality of lands protruding from said wall portion of said power head, and said at least one second piece is a plurality of corresponding tabs projecting from said housing proximate said opening and configured to engage said lands.

4. The cooker as defined in claim 3, wherein said locking means is attached to said manifold proximate at least one of said lands, and spaced from said wall portion.

5. The cooker as defined in claim 4, wherein said locking means includes a plurality of brackets which abuts against said housing to prevent said housing from expanding during cooking operation.

6. The cooker as defined in claim 2, wherein said locking means includes a plurality of brackets which abuts against said housing to prevent said housing from expanding during cooking operation.

7. The cooker as defined in claim 6, wherein each of said brackets include a first portion configured to be attached to said manifold and a second portion extending at an angle from said first part to abut said housing.

8. The cooker as defined in claim 7, wherein said brackets include a third portion extending at an angle from said second portion for guiding said housing into coming in contact with said second portion.

9. The cooker as defined in claim 8, wherein said brackets are formed from a strip of substantially rigid material.

10. The cooker as defined in claim 9, wherein said brackets are formed from metal.

11. The cooker as defined in claim 7, wherein said brackets are attached to said power head by rivets, screws, welding or soldering.

12. An apparatus for preventing a power head of an electric cooker from being detached from a housing of the cooker during a cooking operation, the power head having a heating unit which extends from a bottom of the power head and into the housing through an opening, and the heating unit having a plurality of first pieces for cooperatively engaging corresponding second pieces formed on the housing proximate the opening to secure the power head to the housing, said apparatus comprising:
   at least one bracket configured to be attached to the bottom of the power head proximate at least one of the first pieces formed on the heating unit;
   wherein said at least one bracket is located such that a portion of the housing defining the opening is received between said at least one bracket and the heating unit of the power head, so that said bracket prevents the housing from expanding during a cooking operation and causing the first pieces and the corresponding second pieces to disengage.

13. The apparatus as defined in claim 12, wherein said bracket includes a first portion configured to be attached to said power head; and
   a second portion extending at an angle from said first portion and spaced from the heating unit;
   wherein a gap is provided between the second portion and the heating unit for receiving the portion of the housing defining the opening.

14. The apparatus as defined in claim 13, wherein said at least one bracket include a third portion extending at an angle from said second portion for guiding the portion of the housing defining the opening into said gap formed by said second portion and the heating unit.

15. The apparatus as defined in claim 13, wherein said at least one bracket is attached to the power head by rivets, screws, welding or soldering.

16. The apparatus as defined in claim 13, wherein said at least one bracket is formed from a strip of substantially rigid material.

17. The apparatus as defined in claim 16, wherein said at least one bracket is formed from metal.

18. The apparatus as defined in claim 13, wherein a plurality of brackets are attached to the bottom of the power head.

19. A method for preventing a power head of an electric cooker from being detached from a housing of the cooker during a cooking operation, the power head having a heating unit which extends from a bottom of the power head and into the housing through an opening, and the heating unit having a plurality of first securing pieces for cooperatively engaging corresponding second securing pieces formed proximate the opening of the housing to secure the power head to the housing, said method comprising:

attaching at least one bracket to the bottom of the power head proximate at least one of the first securing pieces formed on the heating unit;

wherein said bracket is located such that a portion of the housing defining the opening is received between said at least one bracket and the heating unit of the power head, so that said bracket prevents the housing from expanding when heated and causing the first and second securing pieces to disengage.

20. The method as defined in claim 19, wherein said at least one bracket includes a first portion configured to be attached to the bottom of the power head; and a second portion extending at an angle from said first portion and spaced from the heating unit; wherein a gap is provided between the second portion and the heating unit for receiving the portion of the housing defining the opening.

21. The method as defined in claim 20 further including forming a third part which extends at an angle from said second portion for guiding the portion of the housing defining the opening into said gap formed by said second portion and the heating unit.

22. A method for releasably securing a power head to a cooking housing of an electric cooker, the power head having a wall portion which extends from a bottom of the power head into the housing through an opening, said method comprising:

providing at least one first securing piece on the wall portion of power head for securing said power head to the housing;

providing at least one corresponding second securing piece on the oven housing for cooperatively engaging said first securing means provided on said wall portion of the power head for releasably securing said power head onto said housing; and placing at least one locking bracket on said power head proximate said at least one first securing piece to prevent expansion of said housing proximate at least said locking bracket during the operation of said cooker.

23. The method as defined in claim 22, wherein said locking bracket includes a first portion configured to be attached to the bottom of the said power head; and a second portion extending at an angle from said first part and spaced from the wall portion of the power head;

wherein a gap is formed between the second portion and the heating unit for receiving the portion of the housing defining the opening.

24. The method as defined in claim 22, wherein said at least one first securing piece includes a plurality of lands protruding from the wall portion of the power head, and said second securing piece includes corresponding tabs projecting from the housing proximate the opening of the housing.

* * * * *